United States Patent
Tomomatsu

(10) Patent No.: US 11,685,195 B2
(45) Date of Patent: Jun. 27, 2023

(54) PNEUMATIC TIRE

(71) Applicant: The Yokohama Rubber Co., LTD., Tokyo (JP)

(72) Inventor: Ryouichi Tomomatsu, Hiratsuka (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 346 days.

(21) Appl. No.: 16/763,961

(22) PCT Filed: Nov. 15, 2018

(86) PCT No.: PCT/JP2018/042299
§ 371 (c)(1),
(2) Date: May 13, 2020

(87) PCT Pub. No.: WO2019/098277
PCT Pub. Date: May 23, 2019

(65) Prior Publication Data
US 2020/0384810 A1  Dec. 10, 2020

(30) Foreign Application Priority Data

Nov. 17, 2017 (JP) .............................. JP2017-222033

(51) Int. Cl.
*B60C 11/12* (2006.01)
*B60C 11/03* (2006.01)

(52) U.S. Cl.
CPC ...... *B60C 11/1281* (2013.01); *B60C 11/1204* (2013.01); *B60C 11/1259* (2013.01);
(Continued)

(58) Field of Classification Search
CPC ............. B60C 11/0304; B60C 11/1281; B60C 11/1236; B60C 11/1204; B60C 11/125
See application file for complete search history.

(56) References Cited

U.S. PATENT DOCUMENTS

2012/0285592 A1  11/2012  Kameda
2013/0167997 A1*  7/2013  Hayashi .............. B60C 11/0306
                                           152/209.18
(Continued)

FOREIGN PATENT DOCUMENTS

EP     0213452     *  3/1987
EP     3 009 275       4/2016
(Continued)

OTHER PUBLICATIONS

English machine translation of EP 0213452. (Year: 1987).*
(Continued)

*Primary Examiner* — Robert C Dye
(74) *Attorney, Agent, or Firm* — Thorpe North & Western

(57) ABSTRACT

A tread pattern of a pneumatic tire includes continuous lands provided in half treads on first and second sides, circumferential main grooves, and sipes having a chamfered configuration. The sipes extend inward in a lateral direction from the circumferential main grooves and are closed in the middle of regions of the continuous lands. An edge shape of each of sipes on the first side includes an extending portion extending inward in the lateral direction constantly in an extension direction and a bent portion that is provided to be joined to an end of the first extending portion and that has the edge shape bent from the extension direction of the first extending portion to a direction close to the circumferential direction. Every portion of the first extending portion and the bent portion of the sipes are provided with a main body portion and a sipe chamfered portion.

19 Claims, 6 Drawing Sheets

(52) U.S. Cl.
CPC ... *B60C 11/0304* (2013.01); *B60C 2011/0341* (2013.01); *B60C 2011/0348* (2013.01); *B60C 2011/0381* (2013.01); *B60C 2011/1254* (2013.01)

(56) References Cited

U.S. PATENT DOCUMENTS

| | | | |
|---|---|---|---|
| 2014/0305559 A1 | 10/2014 | Takemoto | |
| 2017/0297378 A1 | 10/2017 | Honda | |
| 2018/0194173 A1* | 7/2018 | Shibai | B60C 11/032 |
| 2018/0207991 A1 | 7/2018 | Shibai | |
| 2019/0061431 A1 | 2/2019 | Shibai | |

FOREIGN PATENT DOCUMENTS

| | | | |
|---|---|---|---|
| JP | H02-169306 | | 6/1990 |
| JP | 2012-236455 | | 12/2012 |
| JP | 2013-139193 | | 7/2013 |
| JP | 2014-205396 | | 10/2014 |
| JP | 2014237398 | * | 12/2014 |
| JP | 2015-134581 | | 7/2015 |
| JP | 2016-074256 | | 5/2016 |
| JP | 2016-088469 | | 5/2016 |
| JP | 2016-113003 | | 6/2016 |
| JP | 2016-132358 | | 7/2016 |
| JP | 2017-030556 | | 2/2017 |
| JP | 2017-030557 | | 2/2017 |
| WO | WO 2016/075922 | | 5/2016 |
| WO | WO 2017/022308 | | 2/2017 |
| WO | WO 2017/022309 | | 2/2017 |
| WO | WO2017/022309 | * | 2/2017 |
| WO | WO 2017/145681 | | 8/2017 |

OTHER PUBLICATIONS

English machine translation of JP2014237398. (Year: 2014).*
International Search Report for International Application No. PCT/JP2018/042299 dated Feb. 12, 2019, 4 pages, Japan.

* cited by examiner

PNEUMATIC TIRE

TECHNICAL FIELD

The present technology relates to a pneumatic tire.

BACKGROUND ART

For a pneumatic tire, on a tread portion, a tread pattern is formed in which a plurality of main grooves extending in a tire circumferential direction are provided and a plurality of rows of land portions are defined by the plurality of main grooves. In such a pneumatic tire, good drainage performance is achieved by providing a plurality of lug grooves extending in a tire lateral direction in each of the land portions of the tread portion.

However, when the number of the lug grooves in the tread portion is increased, the rigidity of the tread portion (tread rigidity) is degraded, which degrades steering stability performance on dry road surfaces. In contrast, when the number of lug grooves in the tread portion is reduced, drainage performance is degraded, which degrades steering stability on wet road surfaces. Thus, steering stability on dry road surfaces and steering stability on wet road surfaces are inconsistent with each other. Further, pattern noise is increased by providing the lug grooves.

For example, a pneumatic tire capable of achieving steering stability on dry road surfaces and steering stability on wet road surfaces in a compatible manner and further improving uneven wear resistance has been known (see Japan Unexamined Patent Publication No. 2017-30556).

The pneumatic tire includes, in a tread portion, a center main groove extending in tire circumferential direction in a zigzag shape along the tire circumferential direction and a shoulder main groove extending in the tire circumferential direction on an outer side of the center main groove. Further, the pneumatic tire includes, in land portions between the center main groove and the shoulder main groove, a plurality of lug grooves, which extend inward in the tire lateral direction from the shoulder main groove and are terminated without communicating with the center main groove. At a terminating end of each of the lug grooves, a bent portion that is bent toward one side in the tire circumferential direction is formed. In the land portions, a plurality of narrow grooves that extend intermittently along the tire circumferential direction without communicating with the bent portions are formed. The narrow grooves are disposed substantially parallel with the center groove having a zigzag shape.

The pneumatic tire described above is capable of achieving steering stability performance on dry road surfaces and steering stability performance on wet road surfaces in a compatible manner and further improving uneven wear resistance performance. However, pattern noise caused due to the lug grooves provided in the land portions is not reduced, and the pattern noise remains still loud. When the lug grooves are not provided in the land portions, steering stability performance on wet road surfaces is liable to be degraded.

SUMMARY

The present technology provides a pneumatic tire capable of improving steering stability performance on dry road surfaces and steering stability performance on wet road surfaces compared to the related art and suppressing pattern noise.

An aspect of the present technology is a pneumatic tire. The pneumatic tire includes a tread portion that extends in a tire circumferential direction, has an annular shape, and has a tread pattern.

The tread pattern includes: a continuous land portion provided in a half tread region on each of a first side and a second side across a tire equator line, the continuous land portion formed continuously in an entire circumference in the tire circumferential direction; an outer circumferential main groove defining the continuous land portion in the half tread region from an outer side in a tire lateral direction, the outer circumferential main groove continuously extending in the tire circumferential direction; and first sipes each extending inward in the tire lateral direction from the outer circumferential main groove and being closed in a middle of a region of the continuous land portion.

The first sipes each include: a sipe main body portion having a constant distance in a sipe depth direction between facing sipe wall surfaces on a sipe bottom side of the first sipes in the sipe depth direction; and a sipe chamfered portion inclined to have a distance between facing sipe wall surfaces on a side of the tread surface of the first sipes, the distance increased as approaching the tread surface.

Of the first sipes, first sipes a on the first side each include: a first extending portion having an edge shape as seen from the tread surface, extending inward in the tire lateral direction from the outer circumferential main groove on the first side while keeping an extension direction thereof unchanged or changing the extension direction smoothly; and a bent portion being provided to be joined to an end of the first extending portion inward in the tire lateral direction, the bent portion having the edge shape extending to be bent from the extension direction of the end of the first extending portion toward a direction close to the tire circumferential direction. Every portion of the first extending portion and the bent portion of each of the first sipes a is provided with the sipe main body portion and the sipe chamfered portion.

Of the first sipes, first sipes b on the second side each include a second extending portion having an edge shape as seen from the tread surface, extending inward in the tire lateral direction from the outer circumferential main groove on the second side while keeping an extension direction thereof unchanged or changing the extension direction smoothly. The first sipes b each include an end of the second extending portion as a closed end of each of the first sipes b.

The edge shape of the bent portion as seen from the tread surface is preferably an arrow shape, a distal end thereof pointing in an extension direction of the end of the first extending portion inward in the tire lateral direction. The arrow shape preferably includes: in a joint portion between the first extending portion and the bent portion, a first edge and a second edge in a region on one side in a sipe width direction with respect to an arrow-direction imaginary line extending from a center position of each of the first sipes a in the sipe width direction to the distal end, the first edge extending to be inclined with respect to the arrow-direction imaginary line, the second edge extending to the distal end with smaller inclination with respect to the arrow-direction imaginary line as compared to the first edge; and a third edge in a region on the other side in the sipe width direction with respect to the arrow-direction imaginary line, the third edge extending, along an extension of the edge of the first extending portion, from an edge of the first extending portion to the distal end.

The first edge preferably extends from an edge of the joint portion directly or through a curved line or a linear line interposed.

Further, an end of the first edge and an end of the second edge are preferably joined directly or through a curved line or a linear line interposed therebetween.

In the extending portion, inclination angles of chamfers of facing chamfered surfaces of the sipe chamfered portion are preferably identical to each other, and in the bent portion, inclination angles of chamfers are preferably different from each other in a part of the facing chamfered surfaces of the sipe chamfered portion.

The sipe main body portion of each of the first sipes a on the first side preferably extends to the distal end of the arrow shape. In the bent portion, a chamfered surface of the sipe chamfered portion on the side of the first edge and the second edge with respect to the arrow-direction imaginary line preferably includes: a first chamfered surface extending from the chamfered surface of the first extending portion along an extension of the chamfered surface of the first extending portion; and a second chamfered surface being a flat surface, which has a chamfered inclination angle different from that of the first chamfered surface, is joined to the first chamfered surface to form a ridge line, and passes through the first edge positioned on the tread surface. In the bent portion, a chamfered surface of the sipe chamfered portion on the side of the third edge with respect to the arrow-direction imaginary line is preferably a surface extending along an extension of the chamfered surface of the first extending portion.

The ridge line preferably passes through a position of the distal end at which a sipe wall surface of the sipe main body portion and the first chamfered surface are joined.

A chamfered width of the first chamfered surface and a chamfered width of the second chamfered surface are preferably reduced as approaching to the distal end.

The bent portion preferably includes a distal end wall surface being a flat surface that passes through the second edge and is joined to the second chamfered surface, and the wall surface preferably extends in the sipe depth direction, being inclined in a direction closer to a tire radial direction than an inclination direction of the chamfered surface of the sipe chamfered portion.

In this case, the distal end wall surface preferably passes through a position at which the sipe wall surface of the sipe main body portion and the first chamfered surface are joined.

The closed end of each of the first sipes b preferably includes a wall surface being a flat surface that extends in the sipe depth direction at an inclination angle oriented in the tire radial direction as compared to inclination of the chamfered surface of the sipe chamfered portion and that is joined to the chamfered surface of the sipe chamfered portion of each of the first sipes b.

When the continuous land portion is referred to as an intermediate continuous land portion, the tread pattern preferably includes two inner circumferential main grooves that define the intermediate continuous land portions from an inner side in the tire lateral direction and that extend continuously in the tire circumferential direction. Lug grooves are preferably prevented from being provided in regions of a center continuous land portion defined by the two inner circumferential main grooves and the intermediate continuous land portions. Of the two inner circumferential main grooves, a pair of edges of one inner circumferential main groove positioned on the first side preferably includes a groove chamfered portion having a chamfered width changing in the tire circumferential direction and forming a zigzag shape as seen from the tread surface of the tread portion.

Narrow grooves each not communicating with the bent portion are preferably formed intermittently in the tire circumferential direction in a region of an intermediate continuous land portion α of the two intermediate continuous land portions on the first side, and an extension direction of the narrow grooves is preferably parallel with an extension direction of an edge of bent portion on a side close to the center continuous land portion.

Second sipes are preferably provided in a region of an intermediate continuous land portion β of the intermediate continuous land portions on the second side, the second sipes extending from an inner circumferential main groove of the inner circumferential main grooves on the second side and being closed without communicating with the outer circumferential main groove. Third sipes are provided in the region of the center continuous land portion, the third sipes extending from the inner circumferential main groove of the two inner circumferential main grooves on the second side to the other inner circumferential main groove and being closed without communicating with the other inner circumferential main groove. Inclination orientations of the first sipes and the third sipes with respect to the tire lateral direction and positions thereof on the tire circumference are preferably set such that the second sipes are positioned on extension lines of the third sipes.

As seen from the tread surface, the first sipes b of the first sipes, which are provided on the second side, and the second sipes are preferably inclined to different directions of the tire circumferential direction with respect to an identical direction of the tire lateral direction (for example, the first side).

As seen from the tread surface, the first sipes provided on the first side and the second side, and the second sipes are inclined to an identical direction of the tire circumferential direction with respect to an identical direction of the tire lateral direction (for example, the first side).

A shoulder land portion is preferably provided on the outer side of an outer circumferential main groove on the second side. In a region of the shoulder land portion, a circumferential auxiliary groove and shoulder lug grooves are preferably provided, the circumferential auxiliary groove being formed in the entire circumference in the tire circumferential direction, the shoulder lug grooves extending in the tire lateral direction from the outer side in the tire lateral direction and being closed without communicating with the outer circumferential main grooves on the second side. The shoulder lug grooves preferably intersect the circumferential auxiliary groove.

A length of the sipe chamfered portion in the sipe depth direction falls within a range from 15% to 80% of a length of the sipe main body portion in the sipe depth direction.

The tread pattern preferably has the half tread regions having different groove area ratios on both sides in the tire lateral direction across the tire equator line. Of the half tread regions, the groove area ratio of the half tread region on the first side is preferably smaller than the groove area ratio of the half tread region on the second side.

The pneumatic tire preferably has a specified mounting direction when mounting the pneumatic tire on a vehicle, and the first side is positioned on a vehicle outer side.

According to the pneumatic tire described above, steering stability performance on dry road surfaces and steering stability performance on wet road surfaces can be improved compared to the related art, and pattern noise can be suppressed.

DETAILED DESCRIPTION

Hereinafter, a pneumatic tire of the present embodiment will be described in detail.

In the present specification, "tire lateral direction" refers to the direction of the center axis of rotation of a pneumatic tire. "Tire circumferential direction" refers to a rotation direction in which a tread surface rotates, when the tire rotates about the center axis of rotation of the tire. "Tire radial direction" refers to the direction radiating from the center axis of rotation of the tire. "Outward in the tire radial direction" refers to the direction away from the center axis of rotation of the tire. "Inward in the tire radial direction" refers to the direction towards the center axis of rotation of the tire. "Outward in the tire lateral direction" refers to the direction away from the tire equator line in the tire lateral direction. "Inward in the tire lateral direction" refers to the direction toward the tire equator line in the tire lateral direction.

Figure 1:
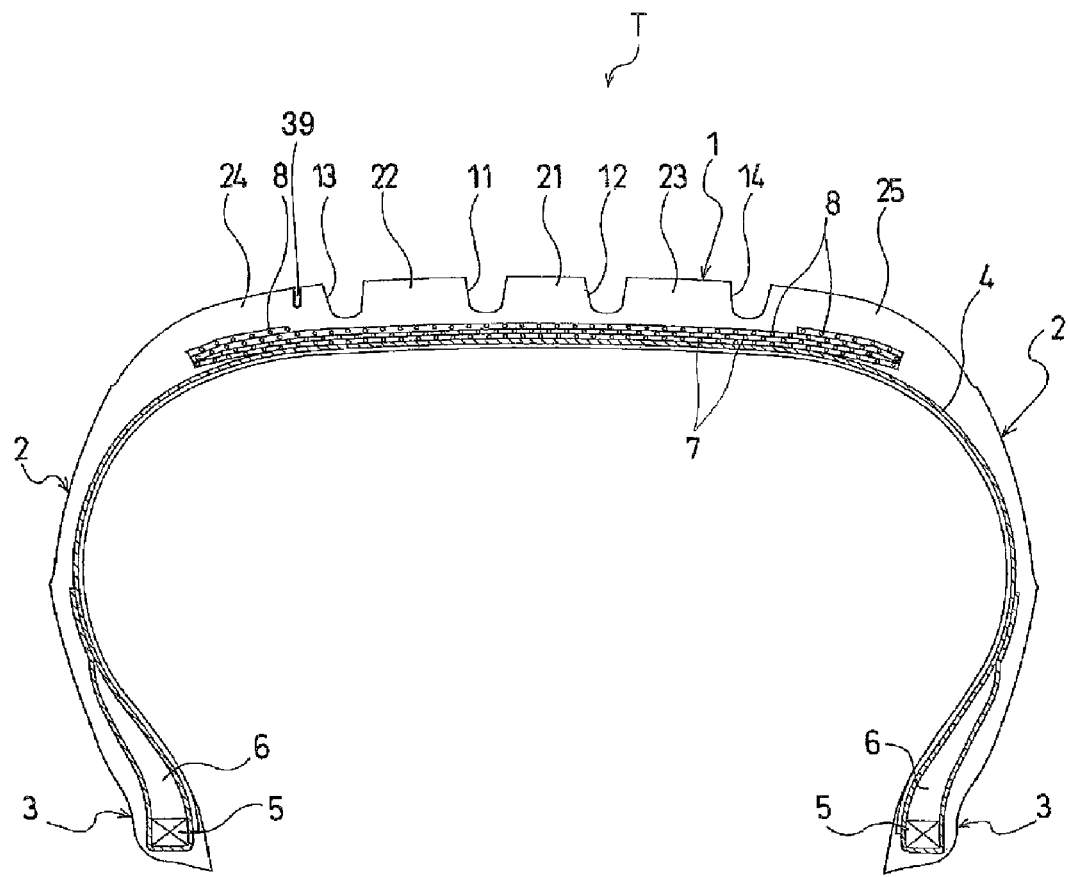
FIG. 1 is a profile cross-sectional view of a pneumatic tire according to an embodiment of the present technology.

FIG. 1 is a profile cross-sectional view of the pneumatic tire according to an embodiment. A pneumatic tire T illustrated in FIG. 1 includes a tread portion 1 having an annular shape and extending in the tire circumferential direction, a pair of sidewall portions 2, 2 disposed on both sides of the tread portion 1, and a pair of bead portions 3, 3 disposed inward in the tire radial direction of the corresponding sidewall portions 2.

A carcass layer 4 is mounted between the pair of bead portions 3, 3. The carcass layer 4 includes a plurality of reinforcing cords extending in the tire radial direction and is folded back around bead cores 5 disposed in each of the bead portions 3 from a tire inner side to a tire outer side. A bead filler 6, extending outward in the tire radial direction, having a triangular cross-sectional shape, and formed from a rubber composition, is disposed on the outer circumference of the bead core 5.

Meanwhile, a plurality of belt layers 7 are embedded outward in the tire radial direction of the carcass layer 4 in the tread portion 1. The belt layers 7 each include a plurality of reinforcing cords that are inclined with respect to the tire circumferential direction, the reinforcing cords being disposed between layers in a criss-cross manner. In the belt layers 7, the inclination angle of the reinforcing cords with respect to the tire circumferential direction falls within a range of from 10° to 40°, for example. Steel cords are preferably used as the reinforcing cords of the belt layers 7. To improve high-speed durability, at least one (two in FIG. 1) belt cover layer 8, having reinforcing cords arranged at an angle of, for example, not more than 5° with respect to the tire circumferential direction, is disposed on an outer circumferential side of the belt layers 7. Nylon, aramid, or similar organic fiber cords are preferably used as the reinforcing cords of the belt cover layer 8.

Note that the tire internal structure described above represents a typical example for a pneumatic tire, and the pneumatic tire is not limited thereto.

Figure 2:
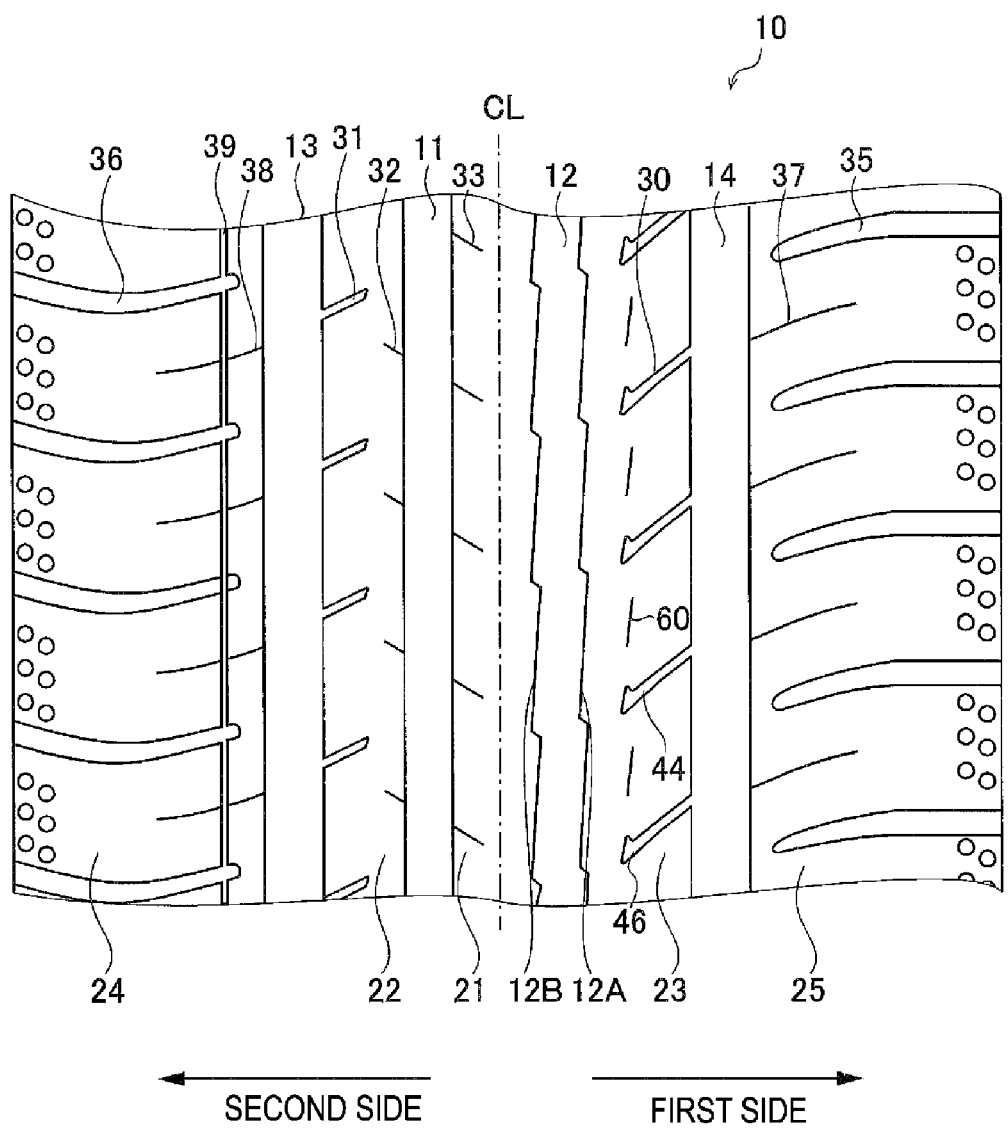
FIG. 2 is a developed view illustrating an example of a tread pattern of the pneumatic tire according to an embodiment.

FIG. 2 is a developed view illustrating an example of a tread pattern 10 of the pneumatic tire T according to an embodiment. The pneumatic tire T having the tread pattern 10 may be suitably used for a passenger vehicle.

In FIG. 2, reference sign CL denotes the tire equator line (tire center line).

The tread pattern 10 mainly includes center main grooves 11, 12, shoulder main grooves 13, 14, a center continuous land portion 21, intermediate continuous land portions 22, 23, and first sipes 30, 31. Here, of half tread regions on both sides in the tire lateral direction across the tire equator line (centerline) CL of the tread pattern 10, a half tread region on a first side in the tire lateral direction preferably has a groove area ratio smaller than a groove area ratio of a half tread region on a second side opposite the first side. That is, a groove area ratio of the tread pattern 10 preferably differs in the half tread region on the first side and the half tread region on the second side.

The center main grooves 11, 12 are positioned on both sides in the tire lateral direction across the tire equator line (centerline) CL and are formed in the entire circumference of the tread portion 1 in the tire circumferential direction. The center main groove 12 is provided on the first side, and the center main groove 11 is provided on the second side. Edges on both groove sides of the center main groove 12 include groove chamfered portions 12A, 12B, the groove chamfered portions 12A, 12B having a chamfered width changing in the tire circumferential direction so as to have a zigzag shape as seen from the tread surface of the tread portion 1. On the edges on both groove sides of the center main groove 12, one of the groove chamfered portions 12A, 12B has a chamfered width that is gradually increased to reach a predetermined width as extending in one direction in the tire circumferential direction, and another of the groove chamfered portions 12A, 12B further starts from a position substantially same as the reached position and has a chamfered width that is gradually increased from a chamfered width of zero to reach a predetermined width. By repeating this, the groove chamfered portions 12A, 12B are formed in the entire circumference of the center main groove 12 in the tire circumferential direction. At the substantially same position in the tire circumferential direction, the chamfered width at which a chamfer starts is zero on the edge of the center main groove 12 on one side, and the chamfered width at which a chamfer in the tire circumferential direction ends is zero on the edge on the other side. Thus, the center main groove 12 has a zigzag shape as seen from the tread surface. In this case, the groove width of the center main groove 12 is kept a certain width, and the center main groove 12 is formed in the entire circumference. In the zigzag shape, regarding the position at which one of the groove chamfered portions 12A, 12B ends and another of the groove chamfered portions 12A, 12B starts, a dimension of a step on the edge in the tire lateral direction (length along the tire lateral direction) falls within a range of from 15% to 35% of the groove width of the center main groove 12, for example.

The center main groove 11 is not provided with a chamfered portion that is similar to those provided to the center main groove 12. The edges on both groove sides of the center main groove 11 extend linearly along the entire circumference of the tire in the tire circumferential direction.

The shoulder main grooves 13, 14 are provided so as to sandwich the center main grooves 11, 12 inward in the tire lateral direction and extend linearly along the entire circumference of the tread portion 1 in the tire circumferential direction without being bent or curved.

The groove width of the center main grooves 11, 12 and the shoulder main grooves 13, 14 falls within a range from 5.0 mm to 15.0 mm, and the groove depth thereof falls within a range from 6.5 mm to 9.0 mm, for example.

The center continuous land portion 21 is formed between the center main grooves 11, 12 and formed continuously in the entire circumference in the tire circumferential direction. The tire equator line (centerline) CL passes on the center continuous land portion 21.

The intermediate continuous land portion 22 is formed between the center main groove 11 and the shoulder main groove 13 and is formed outward (on the second side) in the tire lateral direction of the center continuous land portion 21 and formed in the entire circumference of the tread portion 1 in the tire circumferential direction. The intermediate continuous land portion 23 is formed between the center main groove 12 and the shoulder main groove 14 and is formed outward (on the first side) in the tire lateral direction of the center continuous land portion 21 and formed in the entire circumference of the tread portion 1 in the tire circumferential direction.

In regions of the center continuous land portion 21 and the intermediate continuous land portions 22, 23, lug grooves are not provided at all and only sipes are provided. The lug groove is a groove having an extension direction closer to the tire lateral direction with respect to the tire circumferential direction and is distinguished from the sipe by a dimension.

The first sipes 30 are provided in a region of the intermediate continuous land portion 23, extend inward in the tire lateral direction from the shoulder main groove 14, and are closed in the region of the intermediate continuous land portion 23 without contact with the center main groove 12. The first sipes 31 are provided in a region of the intermediate continuous land portion 22, extend inward in the tire lateral direction from the shoulder main groove 13, and are closed in the region of the intermediate continuous land portion 22 without contact with the center main groove 11.

Shoulder land portions 24, 25 are provided outward in the tire lateral direction of the shoulder main grooves 13, 14. In the regions of the shoulder land portions 24, 25, a plurality of shoulder lug grooves 35, 36 are provided, respectively. The shoulder lug grooves 35, 36 extend inward in the tire lateral direction from the tread pattern ends on both sides in the tire lateral direction, are closed in the regions of the shoulder land portions 24, 25 without contact with the shoulder main grooves 13, 14, and are disposed at a predetermined interval in the tire circumferential direction. Shoulder sipes 37, 38 are provided between the shoulder lug grooves 35, 36 adjacent to each other in the tire circumferential direction. The shoulder sipes 37, 38 are provided inward in the tire lateral direction from the regions of the shoulder land portions 24, 25 so as to be parallel with the shoulder lug grooves 35, 36 and are in contact with the shoulder main grooves 13, 14.

As described above, the tread pattern 10 includes the intermediate continuous land portions 22, 23 (continuous land portions), the shoulder main grooves 13, 14 (outer circumferential main grooves), which respectively define the intermediate continuous land portions 22, 23 in the half tread regions from the outer sides in the tire lateral direction and which extend continuously in the tire circumferential direction, and the first sipes 30 (first sipes a) and the first sipes 31 (first sipes b), which respectively extend inward from the shoulder main grooves 13, 14 in the tire lateral direction and are closed in the middle of the regions of the intermediate continuous land portions.

As illustrated in FIG. 2, the first sipes 30, 31 extend so as to be inclined in the tire lateral direction from the shoulder main grooves 13, 14 on a side of the center continuous land portion 21 and are provided so as to be closed in the regions of the intermediate continuous land portions 22, 23.

Figure 3A:
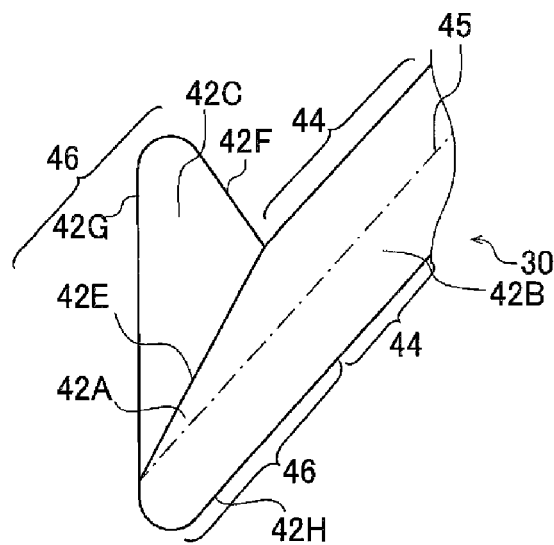
FIGS. 3A and 3B are enlarged plan views illustrating an example of a first sipe illustrated in FIG. 2.
Figure 3B:
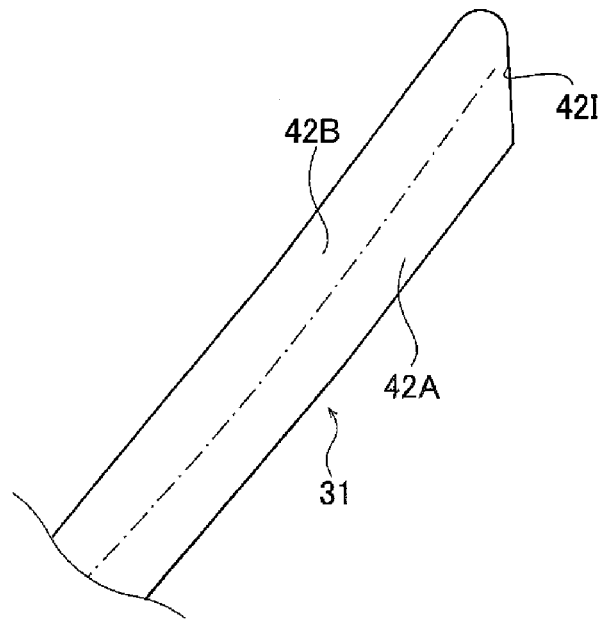
Figure 4A:
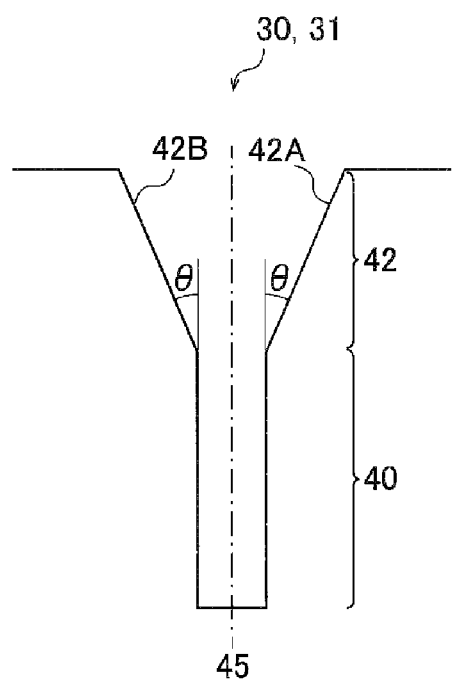
FIGS. 4A and 4B are cross-sectional views of an example of the first sipe illustrated in FIG. 3A.
Figure 4B:
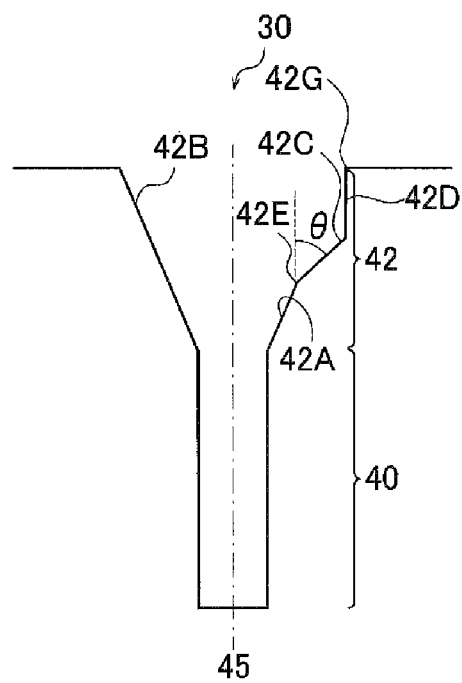
Figure 5:
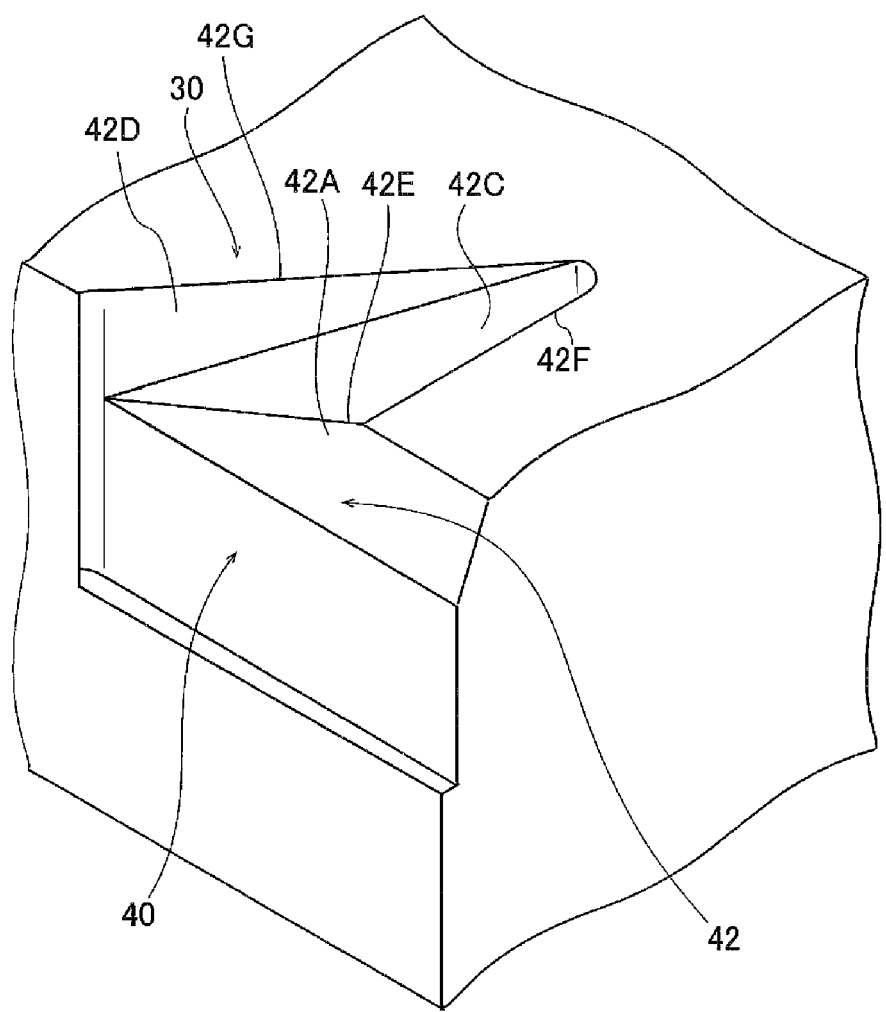
FIG. 5 is a perspective view of an example of the first sipe when the first sipe illustrated in FIG. 3A is cut along a sipe center line.
Figure 6:
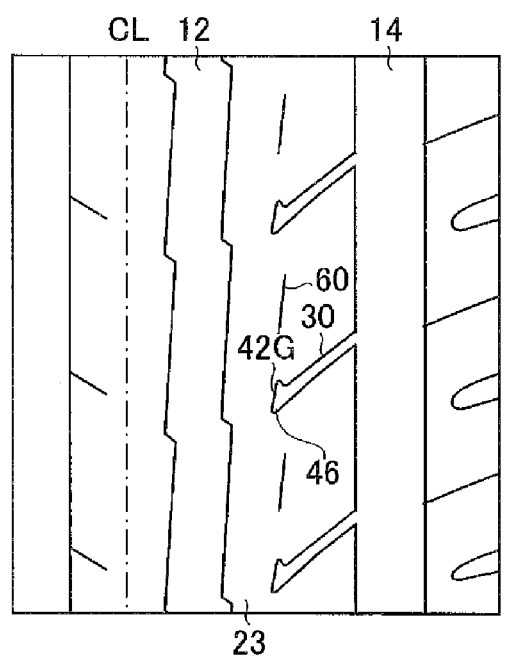
FIG. 6 is an enlarged plan view illustrating main parts of the tread pattern illustrated in FIG. 2.

FIGS. 3A and 3B are enlarged plan views illustrating an example of the first sipes 30, 31. FIGS. 4A and 4B are cross-sectional views of an example of the first sipes 30, 31 illustrated in FIG. 3A. FIG. 5 is a perspective view of an example when the first sipe 30 illustrated in FIG. 3A is cut along a sipe center 45 (see FIG. 3A). FIG. 6 is an enlarged plan view illustrating main parts of the treat pattern 10.

The first sipes 30, 31 each include: a sipe main body portion 40 on a sipe bottom side in a depth direction of the first sipes 30, 31, a distance between the sipe wall surfaces in the sipe depth direction being constant (see FIG. 4A); and a sipe chamfered portion 42 on a side of the tread surface of the first sipes 30, 31, the sipe chamfered portion 42 having the distance between the sipe wall surfaces inclined so as to be increased as approaching the tread surface (see FIG. 4A). That is, the first sipes 30, 31 are so-called chamfered sipes.

As illustrated in FIG. 3A, the first sipes 30 (first sipes a) on the first side each include an extending portion 44 and a bent portion 46 as an edge shape as seen from the tread surface. The extending portion 44 is a portion extending inward in the tire lateral direction so that the edge shape extends, keeping an extension direction unchanged or changing the extension direction smoothly (curved) from the shoulder main groove 14 (outer circumferential main groove). The bent portion 46 is a portion, which is provided to be connected to an end of the extending portion 44 inward in the tire lateral direction and which has the edge shape extending to be bent from the extension direction of the extending portion 44 toward a direction close to the tire circumferential direction. The sipe main body portion 40 and the sipe chamfered portion 42 are provided to both the extending portion 44 and the bent portion 46 of the first sipe 30.

According to an embodiment, the bent portion 46 is preferably formed such that the edge shape of the first sipe 30 (first sipe a) has a shape bent at a right angle or an acute angle. Further, according to an embodiment, when the extending portion 44 extends to one direction in the tire circumferential direction, the bent portion 46 is preferably provided such that the edge shape extends to be bent in a direction opposite the direction in the tire circumferential direction in which the extending portion 44 extends.

Meanwhile, the first sipe 31 (first sipe b) on the second side includes an extending portion having the same shape as the extending portion 44, which extends inward in the tire lateral direction, while keeping an extension direction unchanged or changing the extension direction smoothly (curved) from the shoulder main groove 13 (outer circumferential main groove). An end of the extending portion functions as a closed end of the first sipe 31.

A bent portion similar to the bent portion 46 is not provided to the first sipe 31. The first sipe 31 extends from the shoulder main groove 13 constantly in a constant extension direction or with smooth change and is closed in the region of the intermediate continuous land portion 22 without contact with the center main groove 11. In this case, in the sipe depth direction, the sipe main body portion 40 and the sipe chamfered portion 42 extend to the closed end portion with a cross-sectional shape the same as that of the extending portion 44. An inclination angle of chamfered surfaces 42A and 42B of the sipe chamfered portion 42 (see FIG. 4A) with respect to the sipe depth direction remains as a constant angle without being changed.

A depth of the first sipes 30, 31 falls within a range of from 5.5 mm to 8.5 mm, for example. The first sipes 30, 31 are shallower than the groove depth of the center main grooves 11, 12 and shoulder main grooves 13, 14, and the distance between the sipe wall surfaces of the sipe main body portion 40 falls within a range from 0.3 mm to 0.9 mm, for example. Generally, the distance between the sipe wall surfaces of the sipe falls within a range from 0.3 mm to 0.9 mm in a case where the sipe wall surfaces are parallel with each other. This distance is narrower than the groove width of the main grooves such as the center main grooves 11, 12 and the shoulder main grooves 13, 14. The sipe and the groove can be distinguished from each other by a difference in a distance between parallel sipe wall surfaces and in a dimension of a groove width. The groove width of the center main grooves 11, 12 and the shoulder main grooves 13, 14 or well-known lug grooves is greater than 0.9 mm.

The width of the chamfered surface of the sipe chamfered portion 42 of the extending portion 44 falls within a range from 0.6 mm to 2.0 mm, for example.

As described above, in the regions of the intermediate continuous land portions 22, 23, the first sipes 30, 31 are provided, and the first sipes 30, 31 are both closed in the regions of the intermediate continuous land portions 22, 23. Thus, the degradation of tread rigidity of the intermediate continuous land portions 22, 23 is suppressed as compared to a case where lug grooves are provided in the intermediate continuous land portions 22, 23, and steering stability performance on dry road surfaces is improved. Further, lug grooves are not formed in the region of the center land portion 21, and the degradation of tread rigidity is suppressed. Thus, steering performance at the initial stage of steering on dry road surfaces can also be improved. Meanwhile, the first sipes 30, 31 provided in the intermediate continuous land portions 22, 23 are chamfered sipes, and hence water flows easily on the sipe chamfered portion 42. Further, since a part of the sipe chamfered portion 42 functions as an edge, steering stability performance on wet road surfaces is improved. Further, the first sipes 30, 31 provided in the regions of the intermediate continuous land portions 22, 23 are chamfered sipes, and hence pattern noise can be reduced while maintaining steering stability performance on wet road surfaces as compared to a case of lug grooves being provided. Further, when the groove area ratio of the half tread region on the first side is smaller than that on the second side, the bent portion 46 in the first sipes 30 provided in the half tread region on the first side is capable of compensating insufficient steering stability performance on wet road surfaces, which is caused by a low groove area ratio.

With this, steering stability performance on dry road surfaces and steering stability performance on wet road surfaces can be improved compared to the related art, and pattern noise can be suppressed.

In order to improve steering stability performance on wet road surfaces, an inclination angle θ of the chamfered surfaces 42A, 42B of the sipe wall surfaces of the first sipes 30, 31 with respect to the sipe depth direction (see FIGS. 4A and 4B) preferably falls within a range of from 20 degrees to 80 degrees, for example. In the first sipes 30, 31, the length of the sipe chamfered portion 42 in the sipe depth direction is preferably constant regardless of the position of the first sipes 30, 31 in the extension direction. Therefore, in the first sipes 30, 31, a position in the sipe depth direction of the joint position between the sipe chamfered portion 42 and the sipe main body portion 40 is preferably constant regardless of the position of the first sipes 30, 31 in the extension direction.

The length of the sipe chamfered portion 42 in the sipe depth direction preferably falls within a range from 15% to 80% of the length of the sipe main body portion 40 in the sipe depth direction. When the length of the sipe chamfered portion 42 in the sipe depth direction is less than 15% of the length of the sipe main body portion 40 in the sipe depth direction, improvement in steering stability performance on wet road surfaces is small. When the length of the sipe chamfered portion 42 in the sipe depth direction exceeds 80% of the length of the sipe main body portion 40 in the sipe depth direction, tread rigidity is reduced, and improvement in steering stability performance on dry road surfaces is small.

According to an embodiment, the edge shape of the bent portion 46 of the first sipe 30 as seen from the tread surface has an arrow shape having an distal end thereof pointing in the extension direction of the an end of the extending portion 44 inward in the tire lateral direction. Specifically, as illustrated in FIG. 3A, the arrow shape includes a first edge 42F, a second edge 42G, and a third edge 42H. In the joint portion between the extending portion 44 and the bent portion 46, the first edge 42F and the second edge 42G are in a region on one side in the sipe width direction (the upper left region in FIG. 3A) with respect to an arrow-direction imaginary line (a line passing through the sipe center 45 illustrated in FIG. 3A) extending from the center position in the sipe width direction to the distal end of the arrow in the arrow shape, and the third edge 42H is in a region on the other side in the sipe width direction (the lower right region in FIG. 3A) with respect to the arrow-direction imaginary line (the line passing through the sipe center 45 illustrated in FIG. 3A). The first edge 42F, the second edge 42G, and the third edge 42H have a linear shape.

The first edge 42F extends to be inclined with respect to the arrow-direction imaginary line in the region on one side (the upper left side in FIG. 3A) in the sipe width direction with respect to the arrow-direction imaginary line. The second edge 42G extends to be inclined with respect to the arrow-direction imaginary line. As compared to the first edge 42F, the inclination with respect to the arrow-direction imaginary line is small and extends toward the distal end.

In the example illustrated in FIG. 3A, the first edge 42F linearly extends from the edge of the joint portion between the extending portion 44 and the bent portion 46. However, the first edge 42F may extend from the joint portion between the extending portion 44 and the bent portion 46 through a short curved line or a linear line interposed. The interposed portion preferably has a periphery length being a quarter or smaller of the length of the first edge 42F.

Further, in the example illustrated in FIG. 3A, the end of the first edge 42F and the end of the second edge 42G are joined through a short curved line interposed therebetween. However, such interposed portion may be a linear line instead of a curved line. Further, the end of the first edge 42F and the end of the second edge 42G may be joined directly. That is, the end of the first edge 42F and the end of the second edge 42G may be joined directly or through a curved line or a linear line interposed therebetween. When the interposed portion is present between the ends of the first edge 42F and the edge of the second edge 42G, the periphery length of the interposed portion is preferably a quarter or smaller of a longer length of the length of the first edge 42F and the length of the second edge 42G.

The third edge 42H extends from the edge of the extending portion 44 to the distal end along an extension of the edge of the extending portion 44.

With such shape of the bent portion 46, the region of the sipe chamfered portion 42 is increased, and the edge of the bent portion 46 is increased. Thus, an edge effect is exerted, and steering stability performance on wet road surfaces is improved.

Further, according to an embodiment, on the facing chamfered surfaces 42A, 42B of the sipe chamfered portion 42 of the extending portion 44, the inclination angles of the chamfered surfaces are identical to each other. Meanwhile, on parts of the facing chamfered surfaces of the sipe chamfered portion 42 of the bent portion 46, the inclination angles of the chamfered surfaces are different from each other. For example, as illustrated in FIG. 4B, the inclination angle of the chamfered surface 42A and the inclination angle of the chamfered surface 42B of the bent portion 46 are identical to each other. The inclination angle θ of a chamfered surface 42C illustrated in FIG. 4B is larger than the inclination angle of the chamfered surface 42B. As described above, the inclination angles of the chamfered surface 42B and the chamfered surface 42C of the bent portion 46 are different from each other, and hence a space volume of the sipe chamfered portion 42 can be adjusted (increased) in accordance with the edge shape of the bent portion 46. Thus, a drainage function on the bent portion 46 can be enhanced, and steering stability performance on wet road surfaces is improved.

According to an embodiment, as illustrated in FIG. 5, the sipe main body portion 40 extends to the distal end of the arrow shape. The sipe chamfered portion 42 of the bent portion 46 on a side of the first edge 42F and the second edge 42G includes the chamfered surface 42A (first chamfered surface) and the chamfered surface 42C (second chamfered surface).

The chamfered surface 42A (first chamfered surface) is a chamfered surface extending from the chamfered surface 42A of the extending portion 44 along an extension of the chamfered surface 42A of the extending portion 44.

The chamfered surface 42C (second chamfered surface) is a flat surface, which has the inclination angle θ of a chamfer different from that of the chamfered surface 42A, is joined to the chamfered surface 42A so as to form a ridge line 42E and passes through the first edge 42F positioned on the tread surface. the chamfered surface 42B of the bent portion 46 on the third edge 42H side with respect to the arrow-direction imaginary line is a surface (flat surface) extending the chamfered surface 42B of the extending portion 44 along an extension of the chamfered surface 42B of the extending portion 44.

As described above, the chamfered surface 42C is an inclination surface joined to the tread surface at the first edge 42F, and hence tread rigidity in the region of the land portion in the vicinity of the first edge 42F can be maintained at a high degree. Thus, steering stability performance on dry road surfaces can be improved.

According to an embodiment, the ridge line 42E being a joint portion between the chamfered surface 42A and the chamfered surface 42C has a distal end passing through a position at which the sipe wall surface of the sipe main body portion 40 and the chamfered surface 42A are joined. As described above, the chamfered surface 42C are an inclined surface extending to the joint portion between the chamfered surface 42A and the chamfered surface 42C at the distal end. Thus, a space for drainage in the sipe chamfered portion 42 can be secured. As a result, steering stability performance on wet road surfaces is improved.

In this case, according to an embodiment, the chamfered width of the chamfered surface 42A and the chamfered width of the chamfered surface 42C can be reduced as approaching to the distal end in accordance with the arrow shape, and an effect of a chamfered sipe can be gradually reduced toward the distal end.

Further, according to an embodiment, the bent portion 46 includes a distal end wall surface 42D being a flat surface that passes through the second edge 42G and is joined to the chamfered surface 42C. The distal end wall surface 42D extends in the sipe depth direction at an inclination angle in the tire radial direction as compared to the inclination of the chamfered surface 42A and the chamfered surface 42C of the sipe chamfered portion 42. Therefore, the second edge 42G is positioned on the distal end wall surface 42D that is steep, and hence an edge effect can be highly exerted. The inclination angle of the distal end wall surface 42D with respect to the tread surface falls within a range of from 80 degrees to 110 degrees, for example, a range from 85 degrees to 95 degrees. That is, the distal end wall surface 42D extends in substantially parallel with the tire radial direction. Further, according to an embodiment, as illustrated in FIG. 5, the distal end wall surface 42D preferably passes through the position at which the sipe wall surface of the sipe main body portion 40 and the chamfered surface 42A (first chamfered surface) are joined.

According to an embodiment, the closed end of the first sipe 31 (first sipes b) includes a wall surface 42I (see FIG. 3B). The wall surface 42I is a wall surface extending in the sipe depth direction, inclined in a direction closer to the tire radial direction than an inclination direction of the chamfered surfaces 42A, 42B of the sipe chamfered portion 42. The wall surface 42I is joined to the chamfered surface 42A of the first sipe 31. As described above, the first sipe 31 without the bent portion 46 has a configuration of being closed by the wall surface 42I. As illustrated in FIG. 3B, the wall surface 42I may be provided in an asymmetric manner by being inclined in one direction with respect to the sipe center like a blade shape. The inclination angle of the wall surface 42I with respect to the tread surface falls within a range of from 80 degrees to 110 degrees, for example, a range from 85 degrees to 95 degrees. That is, the wall surface 42I extends in substantially parallel with the tire radial direction.

As illustrated in FIG. 2, in the tread pattern 10, lug grooves are not provided in the regions of the center continuous land portion 21, which are defined by the two center main grooves 11, 12 (inner circumferential main grooves), and the intermediate continuous land portions 22, 23. Of the center main grooves 11, 12, the edges of both groove sides of the center main groove 12 include the groove chamfered portions 12A, 12B having the chamfered width changing in the tire circumferential direction so as to form a zigzag shape as seen from the tread surface of the tread portion. When the groove area ratio of the half tread region on the first side is smaller than the groove area ratio of the half tread region on the second side, the half tread region on the first side is more likely to have insufficient steering stability performance on wet road surfaces as compared to the half tread region on the second side. This insufficient portion can be compensated by an edge effect of the zigzag shape of the center main groove 12 and an edge effect and drainage properties of the bent portion 46 of the first sipe 30.

Moreover, lug grooves are not provided in the regions of the center continuous land portion 21 and the intermediate continuous land portions 22, 23. Thus, the tread rigidity of the center continuous land portion 21 and the intermediate continuous land portions 22, 23 is not degraded, and pattern noise is reduced.

As illustrated in FIG. 2 and FIG. 6, in the region of the intermediate continuous land portion 23 (intermediate continuous land portion α) on the first side, narrow grooves 60 that do not communicate with the bent portions 46 are provided intermittently in the tire circumferential direction. The extension direction of the narrow groove 60 is parallel with the extension direction of the second edge 42G of the bent portion 46 on the center continuous land portion 21 side. The edge of the second edge 42G and the edge of the narrow groove 60 are parallel with each other, and thus the orientation of the edge components can be aligned, which increases an edge effect. Thus, steering stability performance on wet road surfaces can be improved.

The pneumatic tire T preferably has a specified mounting direction with respect to a vehicle so that the first side is positioned on a vehicle outer side. This specification of the mounting direction is indicated as information with characters, symbols, or the like provided on a sidewall surface of the pneumatic tire T. A heavy load is applied in the half tread region on the first side being a cornering outer side at the time of cornering, which largely affects steering stability performance. In such half tread region, the edges of the center main groove 12 in a zigzag shape, the first sipes 30, and the narrow grooves 60, which are positioned on the vehicle outer side with respect to the tire equator line (centerline) CL, further improve steering stability performance on wet road surfaces.

As illustrated in FIG. 2, in the region of the intermediate continuous land portion 22 (intermediate continuous land portion (3) on the second side, second sipes 32, which extend from the center main groove 11 (inner circumferential main groove) and are closed without communicating with the outer circumferential main groove are provided. Further, in the region of the center continuous land portion 21, third sipes 33, which extend from the center main groove 11 (inner circumferential main groove) held in contact with the intermediate continuous land portion 22 on the second side to the center main groove 12 and are closed without communicating with the center main groove 12, are provided. In this case, inclination angles of the second sipes 32 and the third sipes 33 with respect to the tire lateral direction and positions thereof in the tire circumference are preferably set so that the second sipes 32 are positioned on the extension lines of the third sipes 33. With this, the second sipe 32 and the third sipe 33 act like one sipe, and an edge effect is exerted in a concentrated manner. Thus, braking and driving performance on wet road surfaces can be improved. Each of the second sipes 32 and the third sipes 33 is a sipe, which has a constant distance between the facing sipe wall surfaces at any position in the sipe depth direction such that the sipe wall surfaces are parallel with each other.

As seen from the tread surface, the first sipes 31 (first sipes b) and the second sipes 32 formed in the region of the intermediate continuous land portion 22 are preferably inclined to different directions of the tire circumferential direction with respect to the same direction of the tire lateral direction, for example, to a direction to the first side. That is, the first sipe 31 and the second sipe 32 form a chevron shape. With this, even when the pneumatic tire T is at a positive slip angle or a negative slip angle, steering stability performance and braking and driving performance on wet road surfaces can be effectively exerted.

As seen from the tread surface, the first sipes 30, 31 are preferably inclined to the same direction of the tire circumferential direction with respect to the same direction of the tire lateral direction, for example, a direction to the first side. In the example illustrated in FIG. 2, the first sipes 30, 31 extend right upward from the lower left or extend left downward from the upper right on the drawing sheet. The inclination angle of the extension direction of the extending portion 44 of each of the first sipes 30, 31 with respect to the tire circumferential direction preferably falls within a range of from 25 degrees to 75 degrees. When the inclination angle is less than 25 degrees, in the vicinities of the connection portions in which the first sipes 30, 31 are in contact with the shoulder main grooves 13, 14, the tread rigidity of the intermediate continuous land portion 23 is locally degraded, and steering stability performance on dry road surfaces is more likely to be degraded, which is more likely to be a main cause for uneven wear. When the inclination angle is more than 75 degrees, the tread rigidity of the intermediate continuous land portion 23 in the tire circumferential direction is degraded, and steering stability performance on dry road surfaces is more likely to be degraded.

As illustrated in FIG. 2, in the region of the shoulder land portion 24, a circumferential auxiliary groove 39 formed in the entire circumference in the tire circumferential direction and the shoulder lug grooves 36 are provided. The shoulder lug grooves 36 extend in the tire lateral direction from an outer side in the tire lateral direction and are closed without communicating with the shoulder main groove 13. In this case, the shoulder lug grooves 36 preferably intersect the circumferential auxiliary groove 39. The circumferential auxiliary groove 39 prevents the tread rigidity of the shoulder land portion 24 from being excessively increased and adjusts a ground contact area of the shoulder land portion 24. Particularly, when the pneumatic tire T is mounted on a vehicle such that the shoulder land portion 24 is oriented to a vehicle inner side, a ground contact area of the tire can be increased to reduce a ground contact pressure due to an effect of a camber (negative camber). Thus, wear of the shoulder land portion 24 can be suppressed.

The groove width of the circumferential auxiliary groove 39 falls within a range from 0.8 mm to 3.0 mm, for example, and the groove depth thereof falls within a range from 1.0 mm to 4 mm, for example.

Experiment

In order to confirm the effects of the pneumatic tire T according to the present embodiment, pneumatic test tires having various tread patterns were produced and subjected to performance evaluation. Specifically, each produced pneumatic test tire had a tire size of 225/50R17 98W. Each produced pneumatic test tire was mounted to a rim (rim size of 17×7.5J) and was mounted to a test vehicle (four wheel drive vehicle with engine displacement of 2400 cc) under a condition of an air pressure of 230 kPa. The test vehicle traveled on a test course road surface, and evaluation on steering stability performance on dry road surfaces and steering stability performance on wet road surfaces and evaluation on a magnitude of pattern noise were performed.

With regard to evaluation on steering stability performance on dry road surfaces, while performing steering on dry road surfaces, a driver performed sensory evaluation on response corresponding to steering, and Conventional Example was indexed as an index value of 100. Larger index values indicate better performance.

With regard to evaluation on steering stability performance on wet road surfaces, a travel time required for traveling on a predetermined range of wet road surfaces on which rainy weather conditions were reproduced was measured, and a multiplicative inverse thereof was indexed. A multiplicative inverse of a measured travel time in Conventional Example was set as an index value of 100. Thus, larger index values indicate better performance.

With regard to evaluation on pattern noise, sensory evaluation was performed on a magnitude of pattern noise sensed by a driver at the time of causing a vehicle to travel under a predetermined speed condition. Evaluation was performed by indexing Conventional Example as an index value of 100. Larger index values indicate lower pattern noise.

The produced pneumatic test tires T each had a tire structure illustrated in FIG. 1. A tread pattern of the pneumatic tire in Conventional Example was not provided with the first sipes 30, 31 and was provided with lug grooves. The groove width of the lug grooves was set to 4.6 mm.

In Comparative Example 1, the first sipes 30, 31 were provided, but the sipes (non-chamfered sipes) were each formed of the sipe main body portion 40 that was not provided with the sipe chamfered portion 42 and that had a constant distance between the facing sipe wall surfaces in the sipe depth direction. With regard to the distance between the sipe wall surfaces, the distance in the sipe main body portion 40 in each Example and Comparative Examples 1 and 2 described below was set to the same. The sipe depth of the first sipes 30, 31 was set to 5.7 mm, and the distance between the sipe wall surfaces of the sipe main body portion 40 was set to 0.6 mm. In Comparative Example 2 and each Example, the inclination angle θ of the chamfered surfaces 42A, 42B was set to 30 degrees, and the inclination angle θ of the chamfered surface 42C was set to 45 degrees. In Examples including the bent portion 46, the maximum distance between the facing sipe wall surfaces of the sipe chamfered portion 42 was set to 5.5 mm. An "L-like shape" describing the first sipe shape in Example 1 indicates a shape obtained by bending the shape of the extending portion 44 at an angle of 90 degrees. With the "L-like shape", the extension direction of after bending was closer to the tire circumferential direction as compared to the extension direction before bending.

The specifications and the evaluation results are shown in Tables 1 to 3 below.

TABLE 1

|  | Conventional Example | Comparative Example 1 | Comparative Example 2 | Example 1 |
| --- | --- | --- | --- | --- |
| Lug grooves or sipes (chamfered sipes or non-chamfered sipes) in the intermediate continuous land portions | Lug groove | Non-chamfered sipe | Chamfered sipes | Chamfered sipes |
| Presence of a bent portion of the first sipe 30, shape of the first sipe | — | No, — | No, — | Yes, L-like shape, blade shape (FIG. 3B) |
| Length of the sipe chamfered portion 42 in the sipe depth direction/length of the sipe main body portion 40 in the sipe depth direction | — | — | 0.3 | 0.3 |
| Steering stability on dry road surfaces | 100 | 104 | 105 | 105 |
| Steering stability on wet road surfaces | 100 | 95 | 99 | 101 |
| Pattern noise | 100 | 104 | 104 | 104 |

TABLE 2

|  | Example 2 | Example 3 | Example 4 |
| --- | --- | --- | --- |
| Lug grooves or sipes (chamfered sipes or non-chamfered sipes) in the intermediate continuous land portions | Chamfered sipes | Chamfered sipes | Chamfered sipes |
| Presence of a bent portion of the first sipe 30, shape of the first sipe | Yes, Arrow shape (FIG. 3A), blade shape (FIG. 3B) | Yes, Arrow shape (FIG. 3A), blade shape (FIG. 3B) | Yes, Arrow shape (FIG. 3A), blade shape (FIG. 3B) |
| Length of the sipe chamfered portion 42 in the sipe depth direction/length of the sipe main body portion 40 in the sipe depth direction | 0.3 | 0.1 | 0.15 |

TABLE 2-continued

|  | Example 2 | Example 3 | Example 4 |
|---|---|---|---|
| Steering stability on dry road surfaces | 105 | 105 | 105 |
| Steering stability on wet road surfaces | 102 | 100 | 101 |
| Pattern noise | 104 | 104 | 104 |

TABLE 3

|  | Example 5 | Example 6 | Example 7 |
|---|---|---|---|
| Lug grooves or sipes (chamfered sipes or non-chamfered sipes) in the intermediate continuous land portions | Chamfered sipes | Chamfered sipes | Chamfered sipes |
| Presence of a bent portion of the first sipe 30, shape of the first sipe | Yes, Arrow shape (FIG. 3A), blade shape (FIG. 3B) | Yes, Arrow shape (FIG. 3A), blade shape (FIG. 3B) | Yes, Arrow shape (FIG. 3A), blade shape (FIG. 3B) |
| Length of the sipe chamfered portion 42 in the sipe depth direction/length of the sipe main body portion 40 in the sipe depth direction | 0.5 | 0.8 | 0.9 |
| Steering stability on dry road surfaces | 103 | 102 | 101 |
| Steering stability on wet road surfaces | 103 | 104 | 104 |
| Pattern noise | 104 | 104 | 103 |

From Table 1, it is understood that, by providing the first sipes 30, 31 being chamfered sipes in the regions of the intermediate continuous land portions 22, 23 and by providing the bent portion 46 to the intermediate continuous land portion 23, steering stability on dry road surfaces and wet road surfaces can be improved and that pattern noise can be suppressed as compared to Conventional Example.

Particularly, from Tables 1 and 2, it is understood that steering stability on wet road surfaces can further be improved by forming the bent portion 46 of each of the first sipes 30, 31 in an arrow shape as seen from the tread surface.

Further, from Tables 2 and 3, it is understood that steering stability on wet road surfaces can be improved further effectively by providing the length of the sipe chamfered portion 42 in the sipe depth direction to be in a range of from 15% to 80% of the length of the sipe main body portion 40 in the sipe depth direction.

While the pneumatic tire according to the embodiments of the present technology is described above in detail, the present technology is not limited to the above embodiments and may be improved or modified in various ways within a range without departing from the essence of the present technology as a matter of course.

The invention claimed is:

1. A pneumatic tire, comprising:
a tread portion extending in a tire circumferential direction, having an annular shape, and having a tread pattern,
the tread pattern comprising:
a continuous land portion provided in a half tread region on each of a first side and a second side across a tire equator line, each continuous land portion formed continuously in an entire circumference in the tire circumferential direction;
an outer circumferential main groove defining each continuous land portion in each half tread region from an outer side in a tire lateral direction, each outer circumferential main groove continuously extending in the tire circumferential direction; and
first sipes each extending inward in the tire lateral direction from each outer circumferential main groove and being closed in a middle of a region of each continuous land portion,
the first sipes each comprising:
a sipe main body portion having a constant distance in a sipe depth direction between facing sipe wall surfaces on a sipe bottom side of the first sipes in the sipe depth direction; and
a sipe chamfered portion inclined to have a distance between facing sipe wall surfaces of the first sipes on a side of a tread surface, the distance increased as approaching the tread surface,
of the first sipes, first sipes a on the first side each comprising:
a first extending portion having an edge shape, as seen from the tread surface, extending inward in the tire lateral direction from the outer circumferential main groove on the first side while keeping an extension direction thereof unchanged or changing the extension direction smoothly; and
a bent portion being provided to be joined to an end of the first extending portion inward in the tire lateral direction, the bent portion having the edge shape extending to be bent from the extension direction of the end of the first extending portion toward the tire circumferential direction, every portion of the first extending portion and the bent portion of each of the first sipes a being provided with the sipe main body portion and the sipe chamfered portion, of the first sipes, first sipes b on the second side each comprising a second extending portion having an edge shape as seen from the tread surface, extending inward in the tire lateral direction from the outer circumferential main groove on the second side while keeping an extension direction thereof unchanged or changing the extension direction smoothly, and the first sipes b each comprising an end of the second extending portion as a closed end of each of the first sipes b, wherein the edge shape of the bent portion as seen from the tread surface is an arrow shape, a distal end thereof pointing in an extension direction of the end of the first extending portion inward in the tire lateral direction, and the arrow shape includes:

in a joint portion between the first extending portion and the bent portion, a first edge and a second edge in a region on one side in a sipe width direction with respect to an arrow-direction imaginary line extending from a center position of each of the first sipes a in the sipe width direction to the distal end, the first edge extending to be inclined with respect to the arrow-direction imaginary line, the second edge extending to the distal end with smaller inclination with respect to the arrow-direction imaginary line as compared to the first edge; and a third edge in a region on the other side in the sipe width direction with respect to the arrow-direction imaginary line, the third edge extending, along an extension of the edge of the first extending portion from an edge of the first extending portion to the distal end, in the first extending portion, inclination angles of chamfers of facing chamfered surfaces of the sipe chamfered portion are identical to each other, and in the bent portion, inclination angles of chamfers are different from each other in a part of the facing chamfered surfaces of the sipe chamfered portion.

2. The pneumatic tire according to claim 1, wherein the first edge extends from an edge of the joint portion directly or through a curved line or a linear line interposed.

3. The pneumatic tire according to claim 1, wherein an end of the first edge and an end of the second edge are joined directly or through a curved line or a linear line interposed therebetween.

4. The pneumatic tire according to claim 1, wherein the sipe main body portion of each of the first sipes a on the first side extends to the distal end of the arrow shape, in the bent portion, a chamfered surface of the sipe chamfered portion on the side of the first edge and the second edge with respect to the arrow-direction imaginary line comprises:

a first chamfered surface extending from the chamfered surface of the first extending portion along an extension of the chamfered surface of the first extending portion; and a second chamfered surface being a flat surface, which has a chamfered inclination angle different from that of the first chamfered surface, is joined to the first chamfered surface to form a ridge line, and passes through the first edge positioned on the tread surface, and in the bent portion, a chamfered surface of the sipe chamfered portion on the side of the third edge with respect to the arrow-direction imaginary line is a surface extending along an extension of the chamfered surface of the first extending portion.

5. The pneumatic tire according to claim 4, wherein the ridge line passes through a position of the distal end at which a sipe wall surface of the sipe main body portion and the first chamfered surface are joined.

6. The pneumatic tire according to claim 4, wherein a chamfered width of the first chamfered surface and a chamfered width of the second chamfered surface are reduced as approaching to the distal end.

7. The pneumatic tire according to claim 4, wherein the bent portion includes a distal end wall surface being a flat surface that passes through the second edge and is joined to the second chamfered surface, and the distal end wall surface extends in the sipe depth direction, being inclined in a direction closer to a tire radial direction than an inclination direction of the chamfered surface of the sipe chamfered portion.

8. The pneumatic tire according to claim 7, wherein the distal end wall surface passes through a position at which the sipe wall surface of the sipe main body portion and the first chamfered surface are joined.

9. The pneumatic tire according to claim 1, wherein the closed end of each of the first sipes b includes a wall surface being a flat surface that extends in the sipe depth direction at an inclination angle oriented in the tire radial direction as compared to inclination of a chamfered surface of the sipe chamfered portion of each of the first sipes b and that is joined to the chamfered surface of a sipe chamfered portion of each of the first sipes b.

10. The pneumatic tire according to claim 1, wherein when the continuous land portion is referred to as an intermediate continuous land portion, the tread pattern includes two inner circumferential main grooves that define the intermediate continuous land portions from an inner side in the tire lateral direction and that extend continuously in the tire circumferential direction, lug grooves are not provided in regions of a center continuous land portion defined by the two inner circumferential main grooves and the intermediate continuous land portions, and of the two inner circumferential main grooves, a pair of edges of one inner circumferential main groove positioned on the first side includes a groove chamfered portion having a chamfered width changing in the tire circumferential direction and forming a zigzag shape as seen from the tread surface of the tread portion.

11. The pneumatic tire according to claim 10, wherein narrow grooves each not communicating with the bent portion are formed intermittently in the tire circumferential direction in a region of an intermediate continuous land portion α of the two intermediate continuous land portions on the first side, and an extension direction of the narrow grooves is parallel with an extension direction of an edge of the bent portion closest to the center continuous land portion.

12. The pneumatic tire according to claim 10, wherein second sipes are provided in a region of an intermediate continuous land portion β of the intermediate continuous land portions on the second side, the second sipes extending from an inner circumferential main groove of the inner circumferential main grooves on the second side and being closed without communicating with the outer circumferential main groove on the second side, third sipes are provided in the region of the center continuous land portion, the third sipes extending from the inner circumferential main groove of the two inner circumferential main grooves on the second side toward the other inner circumferential main groove and being closed without communicating with the other inner circumferential main groove, and inclination orientations of the second sipes and the third sipes with respect to the tire lateral direction and positions thereof on the tire circumference are set such that the second sipes are positioned on extension lines of the third sipes.

13. The pneumatic tire according to claim 12, wherein, as seen from the tread surface, the first sipes b of the first sipes, which are provided on the second side, and the second sipes are inclined to different directions of the tire circumferential direction with respect to an identical direction of the tire lateral direction.

14. The pneumatic tire according to claim 1, wherein, as seen from the tread surface, the first sipes provided on the first side and the second side are inclined to an identical direction of the tire circumferential direction with respect to an identical direction of the tire lateral direction.

15. The pneumatic tire according to claim 1, wherein a shoulder land portion is provided on the outer side of an outer circumferential main groove on the second side, in a region of the shoulder land portion, a circumferential auxiliary groove and shoulder lug grooves are provided, the circumferential auxiliary groove being formed in the entire circumference in the tire circumferential direction, the shoulder lug grooves extending in the tire lateral direction from the outer side in the tire lateral direction and being closed without communicating with the outer circumferential main groove on the second side, and the shoulder lug grooves intersect the circumferential auxiliary groove.

16. The pneumatic tire according to claim 1, wherein a length of the sipe chamfered portion in the sipe depth direction falls within a range from 15% to 80% of a length of the sipe main body portion in the sipe depth direction.

17. The pneumatic tire according to claim 1, wherein the tread pattern has each half tread region having different groove area ratios on both sides in the tire lateral direction across the tire equator line, and a groove area ratio of a first half tread region on the first side is smaller than the groove area ratio of a second half tread region on the second side.

18. The pneumatic tire according to claim 1, wherein the pneumatic tire has a mounting direction when mounting the pneumatic tire on a vehicle, and the first side is positioned on a vehicle outer side.

19. A pneumatic tire, comprising:

a tread portion extending in a tire circumferential direction, having an annular shape, and having a tread pattern, the tread pattern comprising:

a continuous land portion provided in a half tread region on each of a first side and a second side across a tire equator line, each continuous land portion formed continuously in an entire circumference in the tire circumferential direction;

an outer circumferential main groove defining each continuous land portion in each half tread region from an outer side in a tire lateral direction, each outer circumferential main groove continuously extending in the tire circumferential direction; and first sipes each extending inward in the tire lateral direction from each outer circumferential main groove and being closed in a middle of a region of each continuous land portion, the first sipes each comprising:

a sipe main body portion having a constant distance in a sipe depth direction between facing sipe wall surfaces on a sipe bottom side of the first sipes in the sipe depth direction; and a sipe chamfered portion inclined to have a distance between facing sipe wall surfaces of the first sipes on a side of a tread surface, the distance increased as approaching the tread surface, of the first sipes, first sipes a on the first side each comprising:

a first extending portion having an edge shape, as seen from the tread surface, extending inward in the tire lateral direction from the outer circumferential main groove on the first side while keeping an extension direction thereof unchanged or changing the extension direction smoothly; and a bent portion being provided to be joined to an end of the first extending portion inward in the tire lateral direction, the bent portion having the edge shape extending to be bent from the extension direction of the end of the first extending portion toward the tire circumferential direction, every portion of the first extending portion and the bent portion of each of the first sipes a being provided with the sipe main body portion and the sipe chamfered portion, of the first sipes, first sipes b on the second side each comprising a second extending portion having an edge shape as seen from the tread surface, extending inward in the tire lateral direction from the outer circumferential main groove on the second side while keeping an extension direction thereof unchanged or changing the extension direction smoothly, and the first sipes b each comprising an end of the second extending portion as a closed end of each of the first sipes b, wherein the edge shape of the bent portion as seen from the tread surface is an arrow shape, a distal end thereof pointing in an extension direction of the end of the first extending portion inward in the tire lateral direction, and the arrow shape includes:

in a joint portion between the first extending portion and the bent portion, a first edge and a second edge in a region on one side in a sipe width direction with respect to an arrow-direction imaginary line extending from a center position of each of the first sipes a in the sipe width direction to the distal end, the first edge extending to be inclined with respect to the arrow-direction imaginary line, the second edge extending to the distal end with smaller inclination with respect to the arrow-direction imaginary line as compared to the first edge; and a third edge in a region on the other side in the sipe width direction with respect to the arrow-direction imaginary line, the third edge extending, along an extension of the edge of the first extending portion from an edge of the first extending portion to the distal end, the sipe main body portion of each of the first sipes a on the first side extends to the distal end of the arrow shape, in the bent portion, a chamfered surface of the sipe chamfered portion on the side of the first edge and the second edge with respect to the arrow-direction imaginary line comprises:

a first chamfered surface extending from the chamfered surface of the first extending portion along an extension of the chamfered surface of the first extending portion; and a second chamfered surface being a flat surface, which has a chamfered inclination angle different from that of the first chamfered surface, is joined to the first chamfered surface to form a ridge line, and passes through the first edge positioned on the tread surface, and in the bent portion, a chamfered surface of the sipe chamfered portion on the side of the third edge with respect to the arrow-direction imaginary line is a surface extending along an extension of the chamfered surface of the first extending portion.

\* \* \* \* \*